United States Patent
Jiang et al.

(10) Patent No.: US 11,378,528 B2
(45) Date of Patent: Jul. 5, 2022

(54) TOMOGRAPHIC IMAGING SYSTEM AND CONNECTION ASSEMBLY THEREOF

(71) Applicant: Delta Electronics, Inc., Taoyuan (TW)

(72) Inventors: Fu-Xuan Jiang, Taoyuan (TW); Chiang-Hsun Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 288 days.

(21) Appl. No.: 16/842,549

(22) Filed: Apr. 7, 2020

(65) Prior Publication Data
US 2020/0386694 A1    Dec. 10, 2020

(30) Foreign Application Priority Data
Jun. 4, 2019    (CN) .......................... 201910482544.9

(51) Int. Cl.
| A61B 6/00 | (2006.01) |
| G01N 23/00 | (2006.01) |
| G01N 23/046 | (2018.01) |

(52) U.S. Cl.
CPC ..... *G01N 23/046* (2013.01); *G01N 2223/309* (2013.01); *G01N 2223/3306* (2013.01)

(58) Field of Classification Search
CPC ............................... A61B 6/035; A61B 6/4441
See application file for complete search history.

(56) References Cited

U.S. PATENT DOCUMENTS

| 7,722,814 B2 * | 5/2010 | Egawa ................. G01N 33/491 422/72 |
| 9,088,097 B2 * | 7/2015 | Kim ........................ H01R 24/38 |
| 9,281,638 B2 * | 3/2016 | McBroom .............. H01R 24/38 |

FOREIGN PATENT DOCUMENTS

| CN | 107257073 A | 10/2017 |
| TW | M473838 U | 3/2014 |
| TW | I635672 B | 9/2018 |

\* cited by examiner

*Primary Examiner* — Dani Fox
(74) *Attorney, Agent, or Firm* — Kirton McConkie; Evan R. Witt

(57) ABSTRACT

A tomographic imaging system and a connection assembly thereof are disclosed. The connection assembly includes a carrying platform and a holding bed. The carrying platform includes a rotatable component, a first circuit board and a connecting component. The rotatable component has a first end coupled to a rotor and rotates relative to the first circuit board and the connecting component. The holding bed includes a holding component, a bearing, and a second circuit board. The holding component includes an engaging portion and a holding portion. The second circuit board is coupled to the holding component through the bearing. The engaging portion is detachably connected to the second end of the rotatable component, and the second conductive terminals of the second circuit board abut against the first conductive terminals of the first circuit board to achieve an electric connection, so as to identify the holding bed.

21 Claims, 21 Drawing Sheets

TOMOGRAPHIC IMAGING SYSTEM AND CONNECTION ASSEMBLY THEREOF

FIELD OF THE INVENTION

The present disclosure relates to a tomographic imaging system, and more particularly to a tomographic imaging system and a connection assembly thereof, which are capable of identifying a holding bed automatically.

BACKGROUND OF THE INVENTION

A tomographic imaging system, e.g. CT system, makes use of digital geometry processing to reconstruct a three-dimensional radiological medical image. In the CT system, an object is rotated and irradiated by X-ray beam in the axial or transverse plane, perpendicular to the long axis of the object. Since the different materials have different abilities (also called as radiodensity) to absorb the X-ray beam, many X-ray measurements taken from different angles can be used to reconstruct the cross-sectional (tomographic) images of the scanned object by computer-processed combinations. With the window width and window level processing, a tomographic image of the corresponding materials can be obtained. Consequently, a three-dimensional image can be formed by stacking the tomographic image layers.

In order to achieve the purpose of rotation and detection, a holding bed utilized to carry the object is required to rotate 360 degrees during the detection. On the other hand, in order to carry different objects for detection or to perform the detection in different parameter conditions, there is a need for replacing the holding bed. It is necessary to identify the relative arrangement among the holding bed, the light source generator, and detector correctly, so as to achieve an accurate tomographic scan.

Furthermore, in order to achieve the purpose of identifying the detachable holding bed effectively, as the holding bed is placed on the carrying platform base, it is necessary to electrically connect the holding bed with the carrying platform base for automatic identification. However, the conventional holding bed is in electrical connection through a directional wire connector, and the wire connector has to be inserted into the holding bed at a specific orientation. It is necessary to ensure that each terminal of the wire connector is conductive, respectively, and then the identification is completed successfully. The effect is not good. On the other hand, since the holding bed has to be rotated 360 degrees during the detection, if the conventional wire connector is utilized to identify the holding bed, it is easy to twist the wire connected therebetween during rotating the holding bed. Consequently, it fails to meet the requirements of 360-degree rotation and detection effectively.

Therefore, there is a need for providing a tomographic imaging system and a connection assembly thereof, which are capable of identifying the holding bed automatically, to overcome the above drawbacks.

SUMMARY OF THE INVENTION

An object of the present disclosure is to provide a tomographic imaging system and a connection assembly thereof, which are capable of identifying the holding bed automatically. The structure of the connection assembly includes a bearing connected between the holding component and the circuit board of the loading bed. When the holding component rotates, the circuit board of the loading bed is kept stationary, to avoid the danger of twisting the wire.

Another object of the present disclosure is to provide a tomographic imaging system and a connection assembly thereof, which are capable of identifying the holding bed automatically. The carrying platform of the connection assembly is provided with a plurality of conductive terminals arranged in a concentric circle, which are spatially corresponding to a plurality of conductive terminals linearly arranged on the loading bed. As the loading bed is rotated at any angle in 360-degree rotation, the holding bed and the carrying platform can be connected detachably to achieve an electrical connection therebetween effectively. Thus, the function of identify the holding bed automatically is achieved.

In accordance with an aspect of the present disclosure, a tomographic imaging system is disclosed. The tomographic imaging system includes a frame body, a base, a light generator, a connection assembly, a detector and a controller. The base is slidably disposed on the frame body and includes a rotor. The light generator is disposed on the frame body. The connection assembly includes a carrying platform and a holding bed. The carrying platform is connected to the base and includes a rotatable component, a first circuit board and a connection component. The rotatable component is connected to the rotor of the base and configured to be driven to rotate by the rotor. The connection component is passed through an opening of the rotatable component and connected to the first circuit board and the base respectively. The first circuit board includes a plurality of first conductive terminals. The holding bed includes a holding component, a bearing and a second circuit board. The holding component includes an engaging portion and a space. The second circuit board is accommodated within the space and connected to the holding component through the bearing. The second circuit board includes a plurality of second conductive terminals. The engaging portion is detachably connected to the second end of the rotatable component so that the first conductive terminals and the second conductive terminals are electrically connected to each other to generate an identification signal. The detector is slidably disposed on the frame body. The controller is disposed on the frame body and configured to receive the identification signal and adjust positions of the carry platform, the holding bed and the detector relative to the light generator according to the identification signal respectively. The rotor is controlled by the controller to rotate an object carried on the holding component of the holding bed through the rotatable component. The light generator irradiates the object to perform a tomographic scan.

In accordance with another aspect of the present disclosure, a connection assembly is provided. The connection assembly includes a carrying platform and a holding bed. The carrying platform includes a rotatable component, a first circuit board and a connection component. The rotatable component includes an opening. The first circuit board includes a plurality of first conductive terminals. The connection component is passed through the opening and connected to the first circuit board. The rotatable component is configured to be driven by a rotor to rotate relative to the first conductive terminals and the connection component. The holding bed includes a holding component, a bearing and a second circuit board. The holding component includes an engaging portion and a space. The second circuit board is accommodated within the accommodation space and connected to the holding component through the bearing. The second circuit board includes a plurality of second conductive terminals. The engaging portion and the rotatable component are detachable connected to each other so that the second conductive terminals are spatially corresponding to and electrically connected to the first conductive terminals.

In accordance with a further aspect of the present disclosure, a connection assembly is provided. The connection assembly includes a carrying platform and a holding bed. The carrying platform includes a rotatable component, a plurality of first conductive terminals, and a connection component. The connection component is passed through an opening of rotatable component and supporting the first conductive terminals. The rotatable component is configured to be driven to rotate by a rotor. The holding bed includes a holding component, a bearing and a plurality of second conductive terminals. The holding component includes an engaging portion and a space. The second conductive terminals are accommodated within the accommodation space and connected to the holding component through the bearing. The engaging portion and the rotatable component are detachable connected to each other so that the second conductive terminals are spatially corresponding to and electrically connected to the first conductive terminals to generated an identification signal, and the holding component is driven by the rotor to rotate relative to the first conductive terminals, the second conductive terminals and the connection component.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
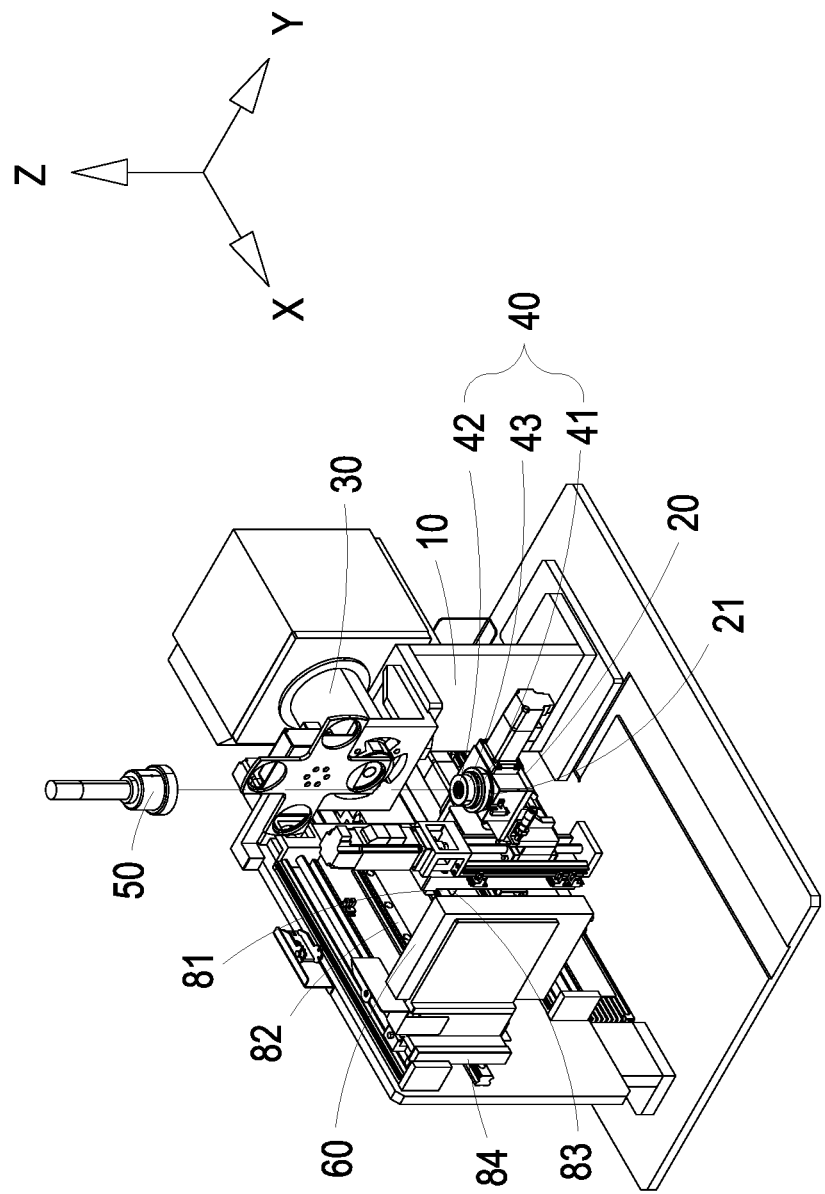
FIGS. 1A and 1B are perspective structural views showing a tomographic imaging system having a connection assembly disassembled according to a first embodiment of the present disclosure and taken at different observation angles.
Figure 1B:
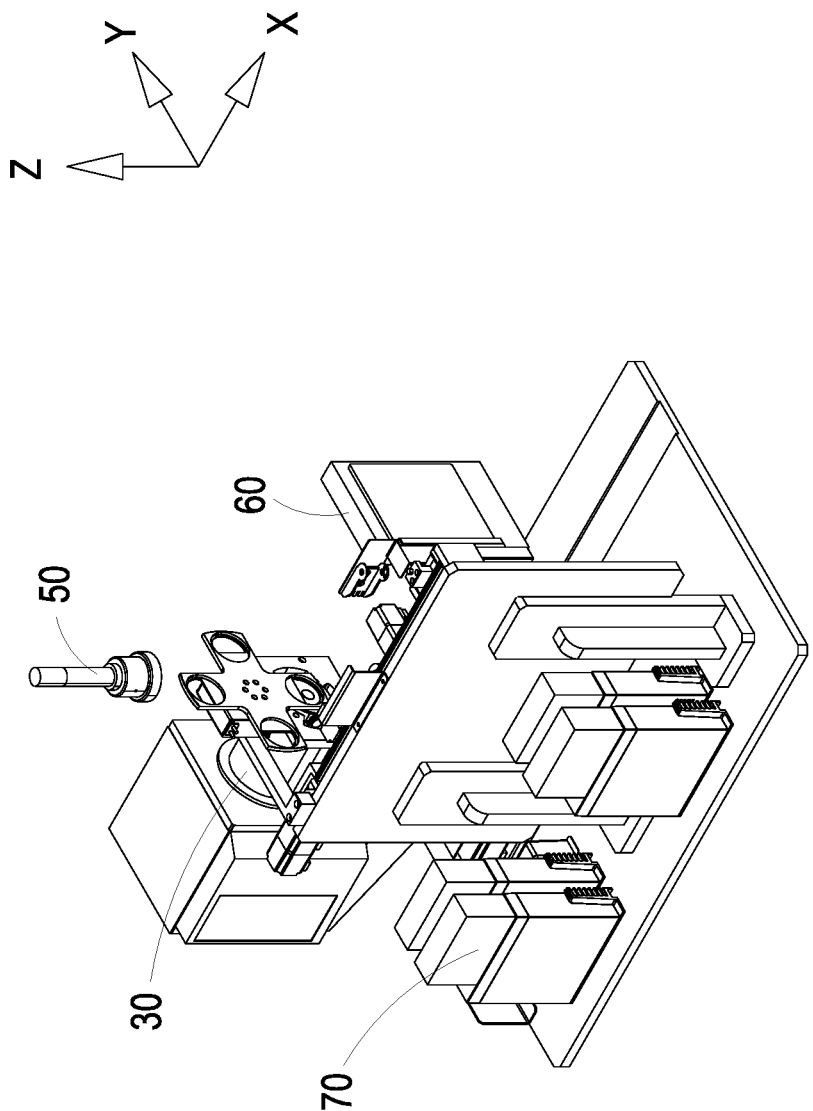
Figure 2A:
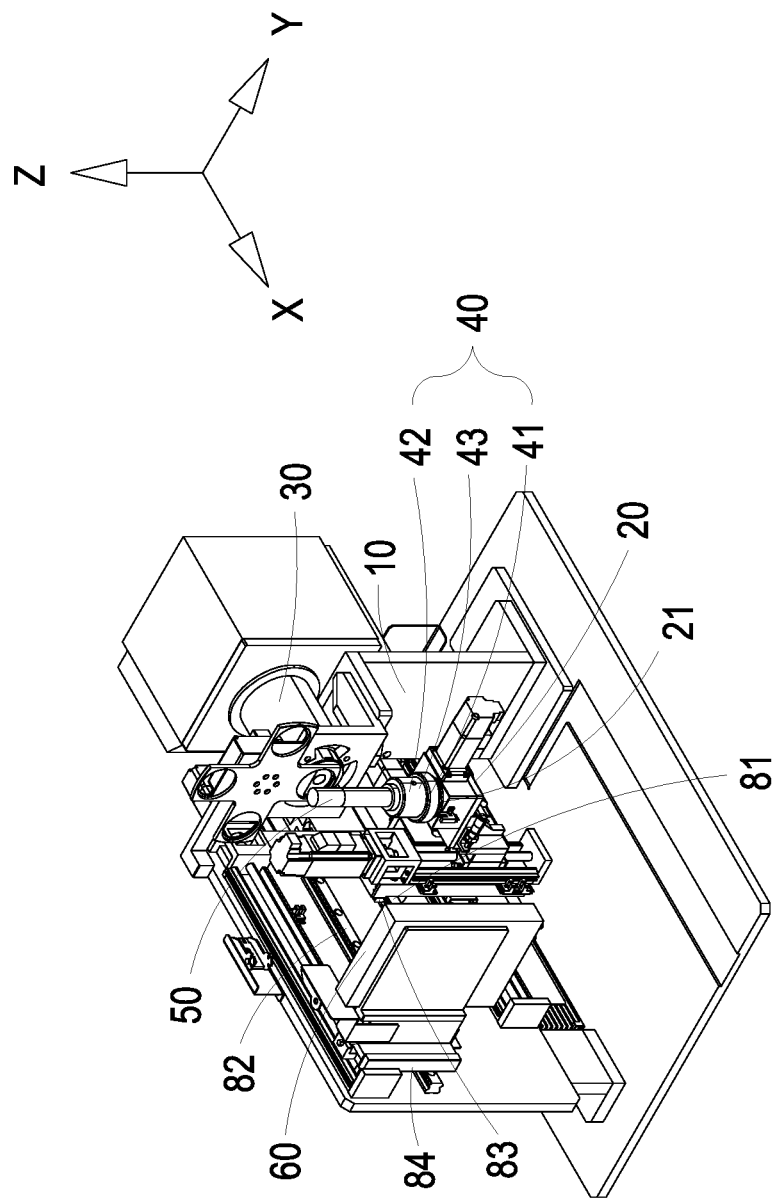
FIGS. 2A and 2B are perspective structural views showing the tomographic imaging system having the connection assembly assembled according to the first embodiment of the present disclosure and taken at different observation angles.
Figure 2B:
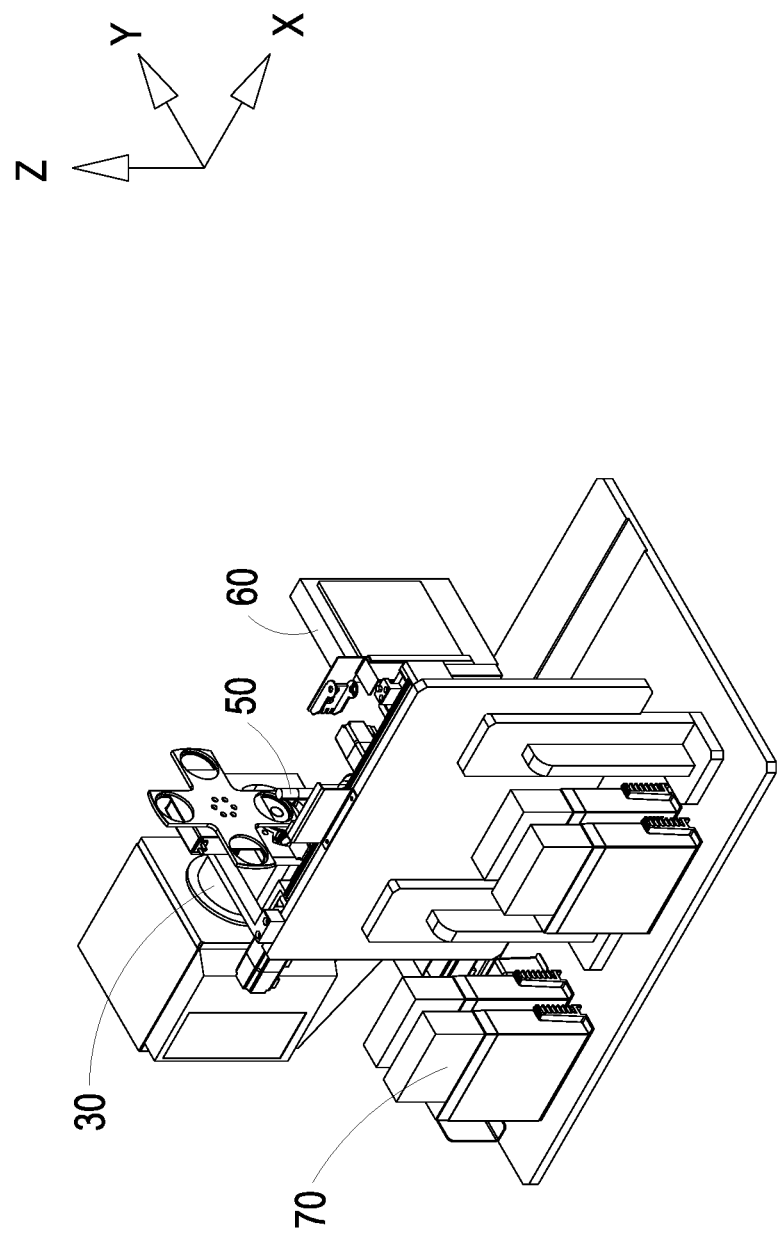
Figure 3:
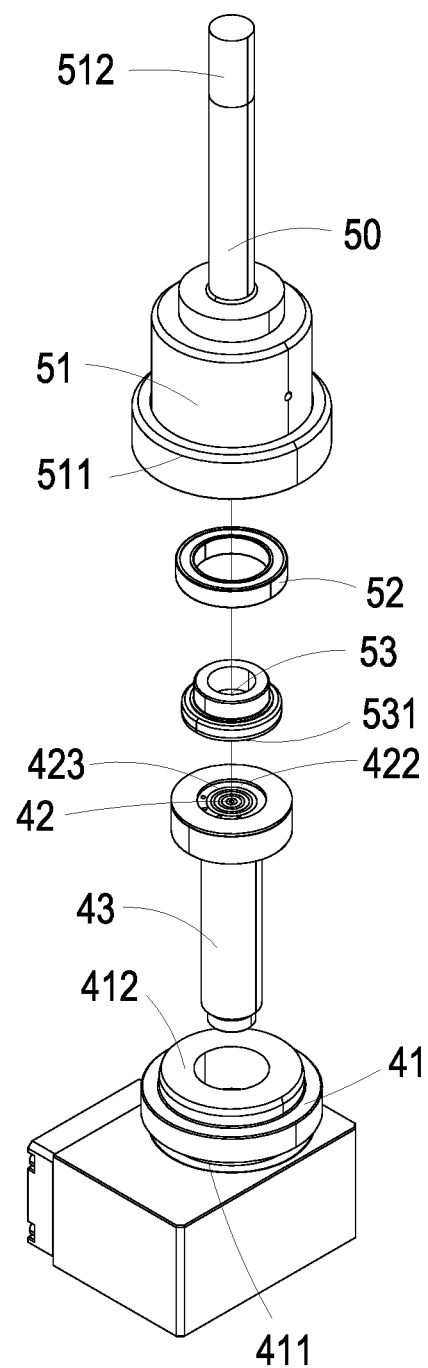
FIG. 3 is an exploded view illustrating the connection assembly of the tomographic imaging system according to the first embodiment of the present disclosure.
Figure 4:
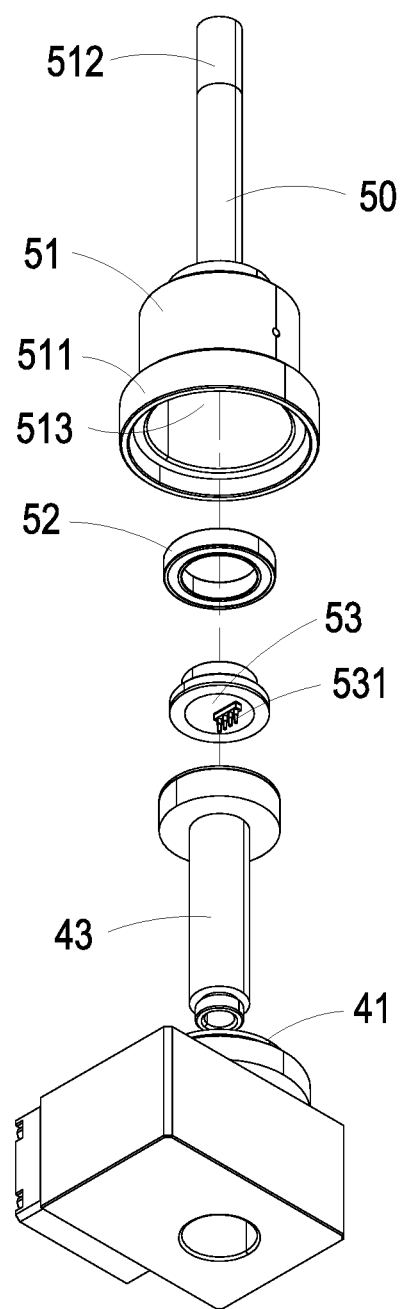
FIG. 4 is an exploded view illustrating the connection assembly of the tomographic imaging system according to the first embodiment of the present disclosure and taken at a different observation angle.
Figure 5:
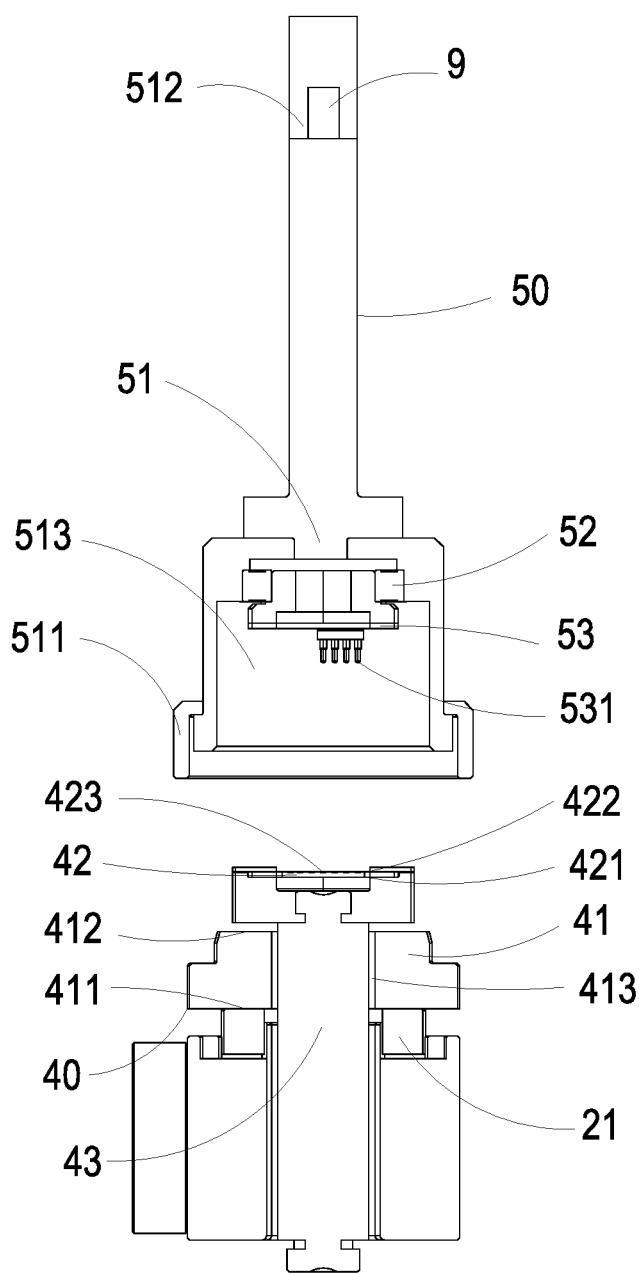
FIG. 5 is a cross sectional view illustrating the connection assembly disassembled according to the first embodiment of the present disclosure.
Figure 6:
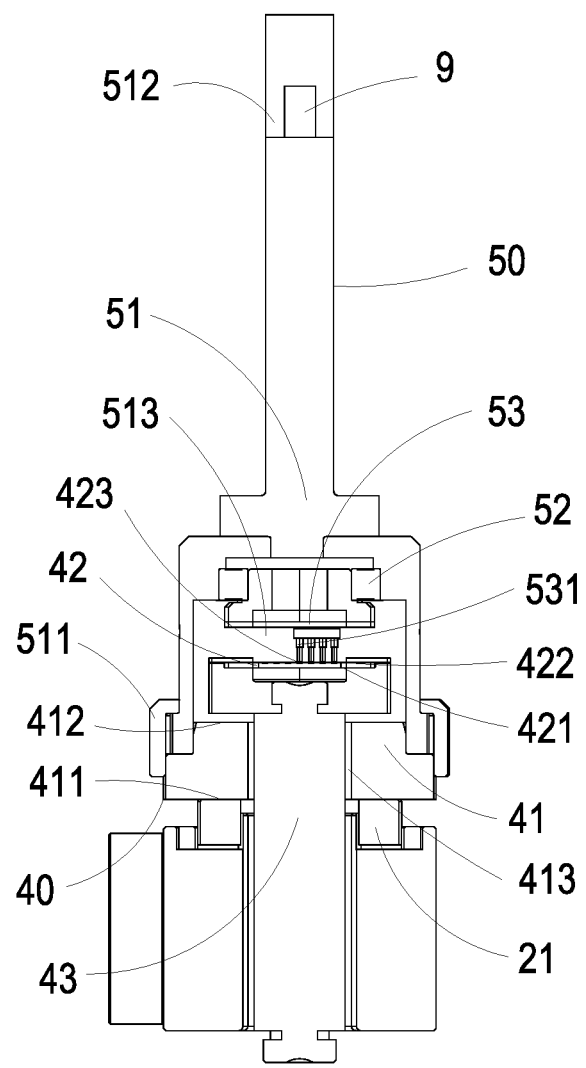
FIG. 6 is a cross sectional view illustrating the connection assembly assembled according to the first embodiment of the present disclosure.

FIGS. 1A and 1B are perspective structural views showing a tomographic imaging system having a connection assembly disassembled according to a first embodiment of the present disclosure and taken at different observation angles. FIGS. 2A and 2B are perspective structural views showing the tomographic imaging system having the connection assembly assembled according to the first embodiment of the present disclosure and taken at different observation angles. FIGS. 3 and 4 are exploded views illustrating the connection assembly of the tomographic imaging system according to the first embodiment of the present disclosure and taken at different observation angles. FIG. 5 is a cross sectional view illustrating the connection assembly disassembled according to the first embodiment of the present disclosure. FIG. 6 is a cross sectional view illustrating the connection assembly assembled according to the first embodiment of the present disclosure. In the embodiment, the tomographic imaging system 1 includes a frame body 10, a base 20, a light generator 30, a connection assembly 4, a detector 60 and a controller 70. The light generator 30 is disposed on the frame body 10 and configured to provide an irradiating light, for example but not limited to an X ray. The base 20 is slidably disposed on the frame body 10 and includes a rotor 21. In the embodiment, the tomographic imaging system 1 further includes at least one first sliding rail 81, for example parallel to the X-axis direction, and connected between the frame body 10 and the base 20. In that, the base 20 is configured to slide relative to the frame body 10 along the first sliding rail 81. In addition, the tomographic imaging system 1 further includes a first movement device 83 disposed between the base 20 and the first sliding rail 81 and electrically connected to the controller 70. In that, the first movement device 83 is controlled by the controller 70 to slide the base 20 along the first sliding rail 81. Thus, the distance between the base 20 and the light generator 30 can be adjusted. In other embodiments, the tomographic imaging system 1 further includes a height adjustment device (not shown) configured to adjust the level of the base 20 relative to the frame body 10, but the present disclosure is not limited thereto.

In the embodiment, the connection assembly 4 includes a carrying platform 40 and at least one holding bed 50. The carrying platform 40 is connected to the base 20 and includes a rotatable component 41, a first circuit board 42 and a connection component 43. The rotatable component 41 includes a first end 411, a second end 412 and an opening 413. The first end 411 and the second end 412 are opposite to each other. The opening 413 runs through the first end 411 and the second end 412. The first end 411 of the rotatable component 41 is connected to the rotor 21 of the base 20 and configured to be driven to rotate by the rotor 21. In the embodiment, the connection component 43 is passed through the opening 413. The first circuit board 42 includes a first side 421, a second side 422 and a plurality of first conductive terminals 423. The first side 421 and the second side 422 are opposite to each other. The first side 421 faces the second end 412 of the rotatable component 41 and is connected to the base 20 through the connection component 43. The plurality of first conductive terminals 423 are disposed on the second side 422. Preferably but not exclusively, the plurality of first conductive terminals 423 are disposed in a concentric circle arrangement. Notably, the plurality of first conductive terminals 423 of the first circuit board 42 are further in electrical connection with the controller 70 by for example but not limited to a conductive via or a conductive wire. It is not an essential feature to limit the present disclosure and not redundantly described herein. In the embodiment, the at least one holding bed 50 includes a holding component 51, a bearing 52 and a second circuit board 53. The holding component 51 includes an engaging portion 511, a holding portion 512 and an accommodation space 513. The engaging portion 511 and the holding portion 512 are opposite to each other. The holding portion 512 is configured to carry an object 9. In that, the irradiating light of the light generator 30 can irradiate the object 9 to perform a tomographic scan. The second circuit board 53 and the bearing 52 are accommodated within the accommodation space 513. The second circuit board 53 is connected to the holding component 51 through the bearing 52. Preferably but not exclusively, in the embodiment, the second circuit board 53 is mounted on the inner race of the bearing 52 and the holding component 51 is mounted on the outer race of the bearing 52. In the embodiment, the second circuit board 53 includes a plurality of second conductive terminals 531. The plurality of second conductive terminals 531 are spatially corresponding to the plurality of first conductive terminals 423. Preferably but not exclusively, in the embodiment, the plurality of second conductive terminals 531 are disposed in a linear arrangement. In the embodiment, the engaging portion 511 of the holding component 51 of the holding bed 50 is detachably connected to the second end 412 of the rotatable component 41. Preferably but not exclusively, the engaging portion 511 of the holding component 51 and the second end 412 of the rotatable component 41 are detachably connected to each other by two corresponding screw threads. In other embodiments, the engaging portion 511 of the holding component 51 includes an annular collar, which is fitted to the second end 412 of the rotatable component 41. In that, the holding component 51 of the holding bed 50 is connected to the rotatable component 41 of the carrying platform 40. When the rotatable component 41 is driven to rotate by the rotor 21, the holding component 51 of the holding bed 50 is driven to rotate synchronously. On the other hand, when the engaging portion 511 of the holding component 51 of the holding bed 50 is connected to the second end 412 of the rotatable component 41 of the carrying platform 40, the plurality of second conductive terminals 531 of the second circuit board 53 and the plurality of first conductive terminals 423 of the first circuit board 42 abut against and are electrically connected to each other to generate an identification signal, which is transmitted to the controller 70. Thus, the holding bed 50 connected to the carrying platform 40 can be identified by the controller 70 according to the identification signal, so as to perform the tomographic scan. Preferably but not exclusively, in the embodiment, each second conductive terminal 531 is an elastic conductive terminal. When the second conductive terminal 531 abuts against the corresponding first conductive terminal 423, an elastic cushioning force is provided therebetween. Notably, in the connection assembly 4, since the holding component 51 and the second circuit board 53 are connected through the bearing 52 of the holding bed 50, when the rotor 21 drives the rotatable component 41 of the carrying platform 40 and the holding component 51 of the holding bed 50 to rotate relative to the plurality of first conductive terminals 423, the first circuit board 42 and the connection component 43 of the carrying platform 40, the plurality of second conductive terminals 531 and the second circuit board 53 of the holding bed 50, so as to avoid the danger of twisting the wire. Therefore, the plurality of first conductive terminals 423, the first circuit board 42, the connection component 43, the plurality of second conductive terminals 531 and the second circuit board 53 are relative stationary as the object 9 carried by holding portion 512 of the holding component 51 is driven to rotate.

Moreover, in order to perform the tomographic scan, the detector 60 is slidably disposed on the frame body 10 and configured to be controlled to slide by the controller 70. In the embodiment, the tomographic imaging system 1 further includes at least one second sliding rail 82, for example parallel to the X-axis direction, and connected between the frame body 10 and the detector 60. In that, the detector 60 is configured to slide relative to the frame body 10 along the second sliding rail 82. Moreover, the tomographic imaging system 1 further includes a second movement device 84 disposed between the detector 60 and the second sliding rail 82 and electrically connected to the controller 70. In that, the second movement device 84 is controlled by the controller 70 to slide the detector 60 along the second sliding rail 82. Thus, the distance between the detector 60 and the object 9 and the distance between the detector 60 and the light generator 30 can be adjusted. Preferably but not exclusively, in the embodiment, the controller 70 is disposed on the frame body 10 and electrically connected to the light generator 30, the rotor 21, the carrying platform 40, the first circuit board 42 and the detector 60. The controller 70 is configured to receive the identification signal and adjust positions of the carrying platform 40, the holding bed 50 and the detector 60 relative to the light generator 30 according to the identification signal, respectively. In the embodiment, the rotor 21 is controlled by the controller 70 to rotate the object 9 carried on the holding component 51 of the holding bed 50 through the rotatable component 41. Thus, the irradiating light of the light generator 30 irradiates the object 9 to perform a tomographic scan. Namely, when the holding bed 50 is detachably connected to the carrying platform 40, the controller 70 not only controls the base 20 to move the carrying platform 40 and the holding bed 50 for example along the X-axis direction, but also controls the base 20 to move the carrying platform 40 and the holding bed 50 to adjust the height level of the object 9 for example along the Z-axis direction. At the same time, the detector 60 is controlled to move along the X-axis direction. Thus, the light generator 30, the object 9 and the detector 60 are arranged in a line to perform the tomographic scan.

Figure 7:
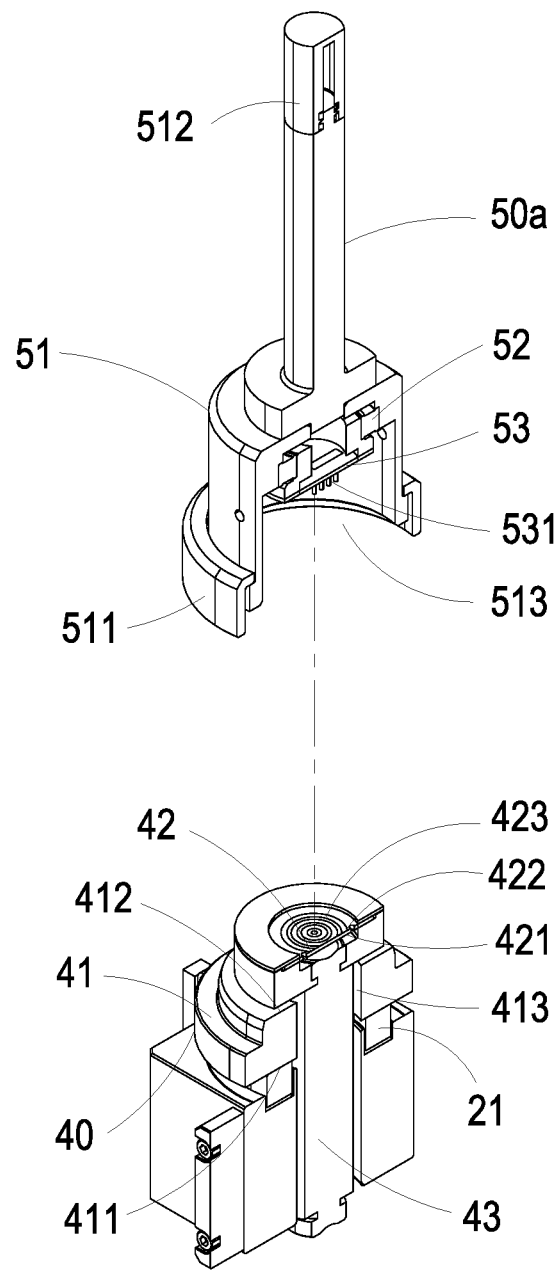
FIG. 7 is a cross sectional view illustrating a first exemplary structure of the connection assembly of the present disclosure.
Figure 8:
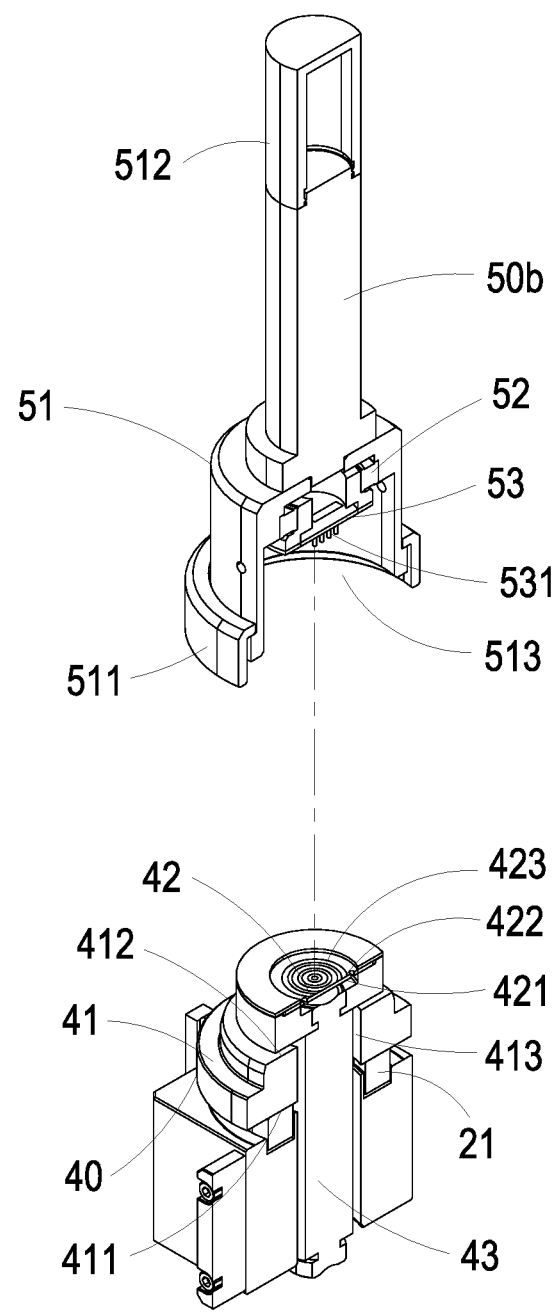
FIG. 8 is a cross sectional view illustrating a second exemplary structure of the connection assembly of the present disclosure.
Figure 9:
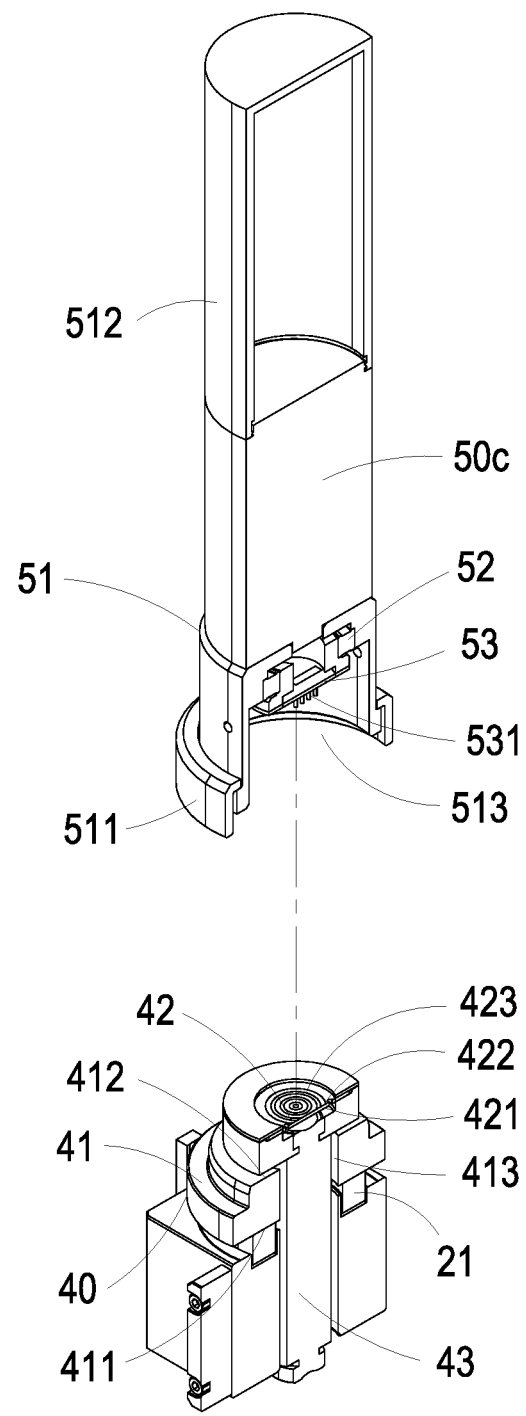
FIG. 9 is a cross sectional view illustrating a third exemplary structure of the connection assembly of the present disclosure.
Figure 10:
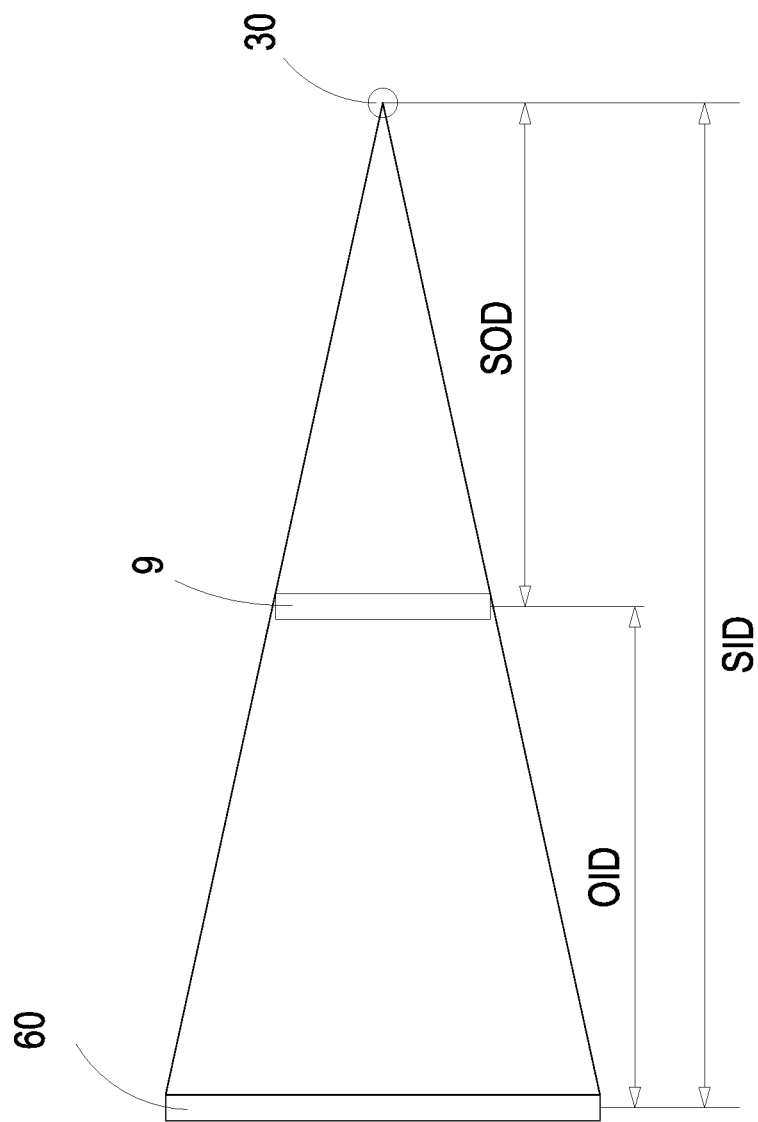
FIG. 10 shows the relationship among the light generator, the object and the detector of the tomographic imaging system of the present disclosure.

In the embodiment, the holding bed 50 is detachably connected to the carrying platform 40 of the connection assembly 4. Namely, in other embodiments, the carrying platform 40 on the base 20 can be connected to one selected from a plurality of holding beds 50. FIG. 7 is a cross sectional view illustrating a first exemplary structure of the connection assembly of the present disclosure. FIG. 8 is a cross sectional view illustrating a second exemplary structure of the connection assembly of the present disclosure. FIG. 9 is a cross sectional view illustrating a third exemplary structure of the connection assembly of the present disclosure. Preferably but not exclusively, a first holding bed 50a, a second holding bed 50b and a third holding bed 50c include the engaging portions 511, the accommodation spaces 513, the bearings 52 and the second circuit boards 54 with the same specification, but have the holding portions 512 with different sizes, respectively. In that, the first holding bed 50a, the second holding bed 50b and the third holding bed 50c can be utilized selectively to carry the object 9 to perform the tomographic scan according to the practical requirements. Since each of the first holding bed 50a, the second holding bed 50b and the third holding bed 50c can be detachably connected to the rotatable component 41 of the carrying platform 40, the user can select one of the first holding bed 50a, the second holding bed 50b and the third holding bed 50c to connect to the carrying platform 40 for performing the tomographic scan according to the practical requirements. FIG. 10 shows the relationship among the light generator, the object and the detector of the tomographic imaging system of the present disclosure. Since the first holding bed 50a, the second holding bed 50b, and the third holding bed 50c have different operational conditions for performing a tomographic scan, there is a need for identification. In the embodiment, when the engaging portion 511 of the first holding bed 50a is detachably connected to the second end 412 of the rotatable component 41, the plurality of second conductive terminals 531 of the second circuit board 53 and the plurality of first conductive terminals 423 of the first circuit board 42 abut against and are electrically connected to each other to generate a first identification signal. When the engaging portion 511 of the second holding bed 50b is detachably connected to the second end 412 of the rotatable component 41, the plurality of second conductive terminals 531 of the second circuit board 53 and the plurality of first conductive terminals 423 of the first circuit board 42 abut against and are electrically connected to each other to generate a second identification signal. When the engaging portion 511 of the third holding bed 50c is detachably connected to the second end 412 of the rotatable component 41, the plurality of second conductive terminals 531 of the second circuit board 53 and the plurality of first conductive terminals 423 of the first circuit board 42 abut against and are electrically connected to each other to generate a third identification signal. Preferably but not exclusive, each of the first identification signal, the second identification signal and the third identification signal includes parameters of a first distance SID between the light generator 30 and the detector 60, a second distance SOD between the light generator 30 and the object 9 and a third distance OID between the object 9 and the detector 60.

Table 1 lists the parameters of the first identification signal, the second identification signal and the third identification signal for the first holding bed 50a, the second holding bed 50b and the third holding bed 50c, respectively. Certainly, the present disclosure is not limited thereto.

|  | first holding bed 50a | second holding bed 50b | third holding bed 50c |
| --- | --- | --- | --- |
| SID (mm) | 329.681 | 301.117 | 301.172 |
| SOD (mm) | 33.709 | 91.446 | 200.608 |
| OID (mm) | 295.972 | 209.671 | 100.564 |
| Resolution pixel size (μm) | 5 | 15 | 33 |

In the embodiment, the first holding bed 50a, the second holding bed 50b and the third holding bed 50c include the first identification signal, the second identification signal and the third identification signal, respectively, which include different parameters to control the first distance SID between the light generator 30 and the detector 60, the second distance SOD between the light generator 30 and the object 9 and the third distance OID between the object 9 and the detector 60 for generating different resolution. The present disclosure is not limited thereto and not redundantly described. Notably, in the embodiment, when any one of the first holding bed 50a, the second holding bed 50b and the third holding bed 50c is detachably connected to the carrying platform 40, the plurality of first conductive terminals 423 of the first circuit board 42 are disposed in the concentric circle arrangement on the carrying platform 40, the selected holding bed 50 is rotated around an axis passing through the center of the concentric circle arrangement, and the plurality of first conductive terminals 423 are spatially corresponding to the plurality of second conductive terminals 531 of the second circuit board 53, which are disposed in a linear arrangement. In that, no matter the selected holding bed 50 is rotated to any angle, after the selected holding bed 50 and the carrying platform 40 are detachably connected, the plurality of first conductive terminals 423 of the first circuit board 42 and the plurality of second conductive terminals 531 of the second circuit board 53 are in electrical connection with each other effectively to generate an identification signal. Thus, the controller 70 can identify which of the first holding bed 50a, the second holding bed 50b and the third holding bed 50c detachably connected to the carrying platform 40 according to the received identification signal. At the same time, the positions of the carrying platform 40, the object 9, and the detector 60 relative to the light generator 30 are adjusted by the controller 70 according to the identification signal, the rotor 21 is controlled to drive the rotatable component 41 to rotate the object 9 carried on the holding component 51 of the holding bed 50, and the object 9 is irradiated by the irradiating light of the light generator 30, so as to perform the tomographic scan.

Figure 11A:
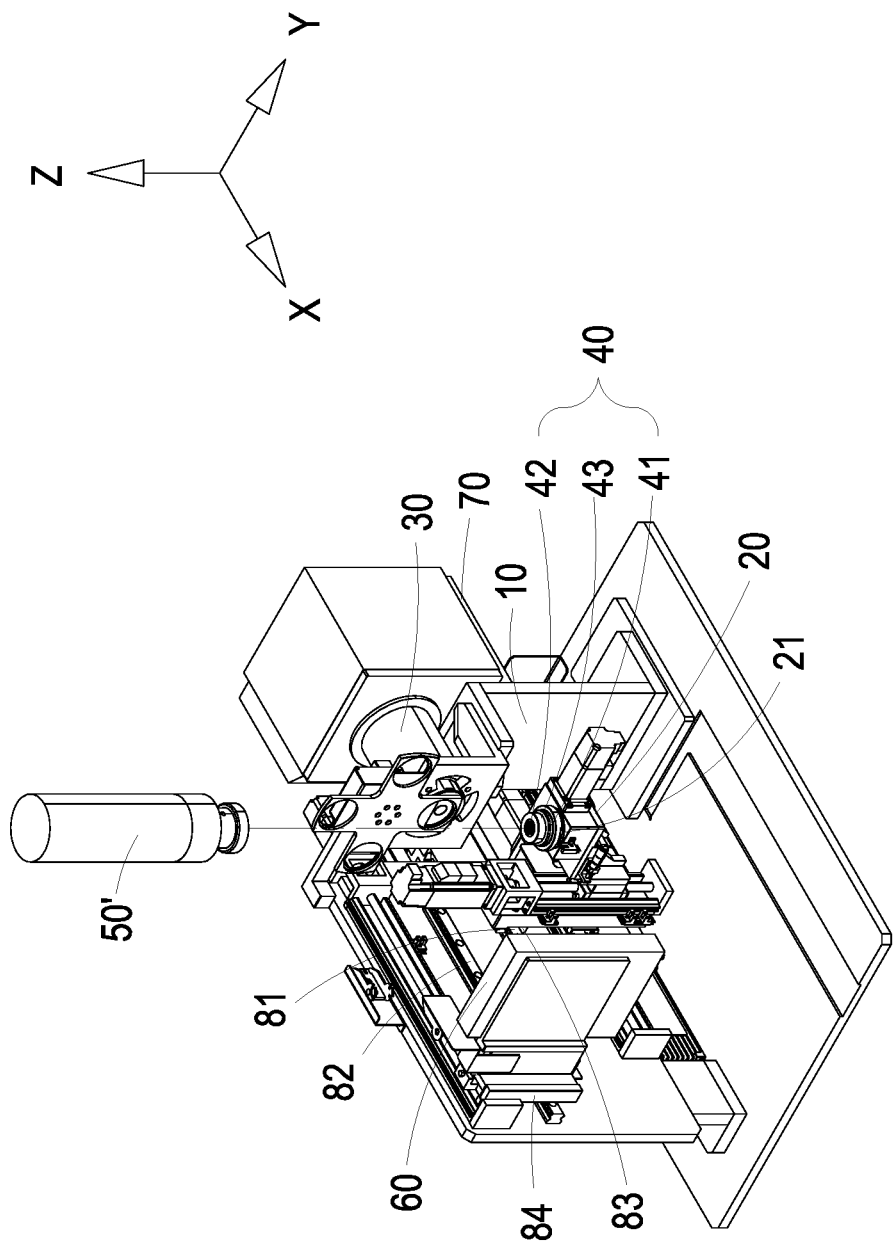
FIGS. 11A and 11B are perspective structural views showing a tomographic imaging system having a connection assembly disassembled according to a second embodiment of the present disclosure and taken at different observation angles.
Figure 11B:
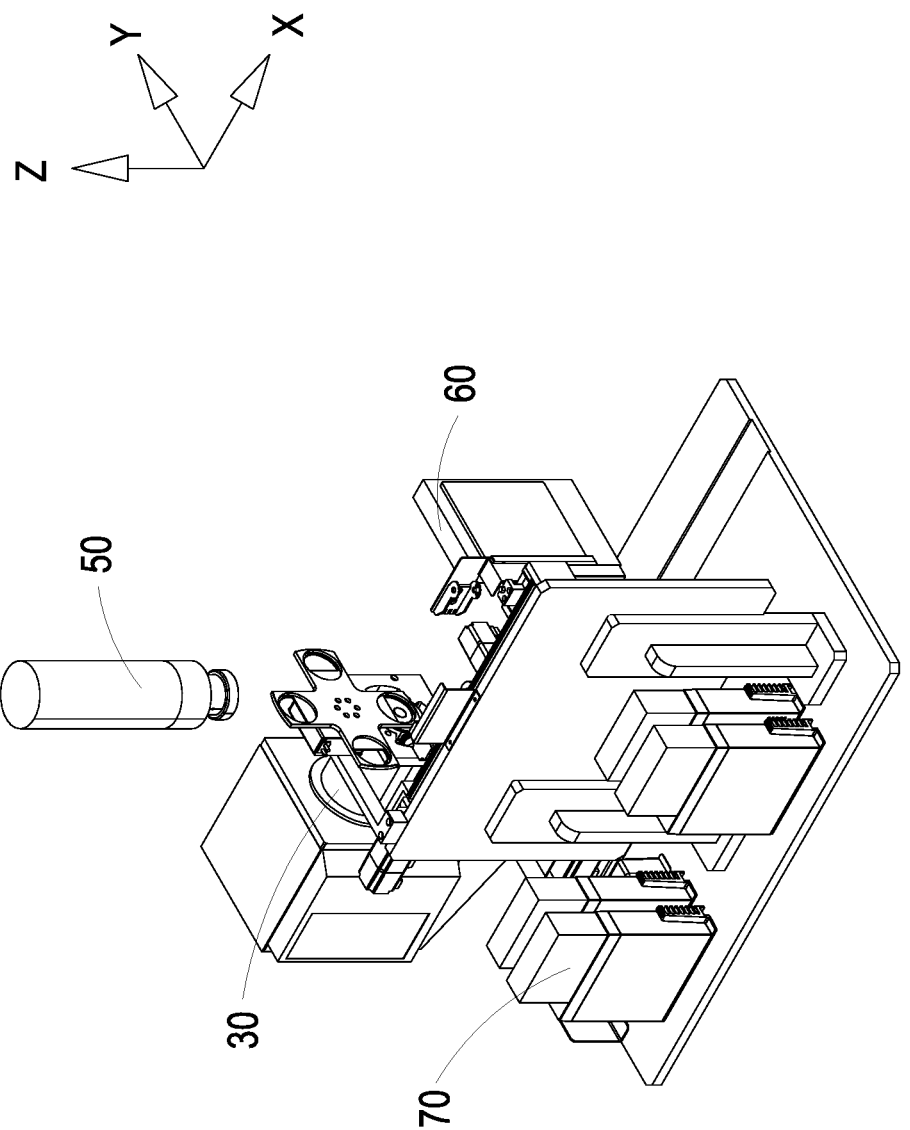
Figure 12A:
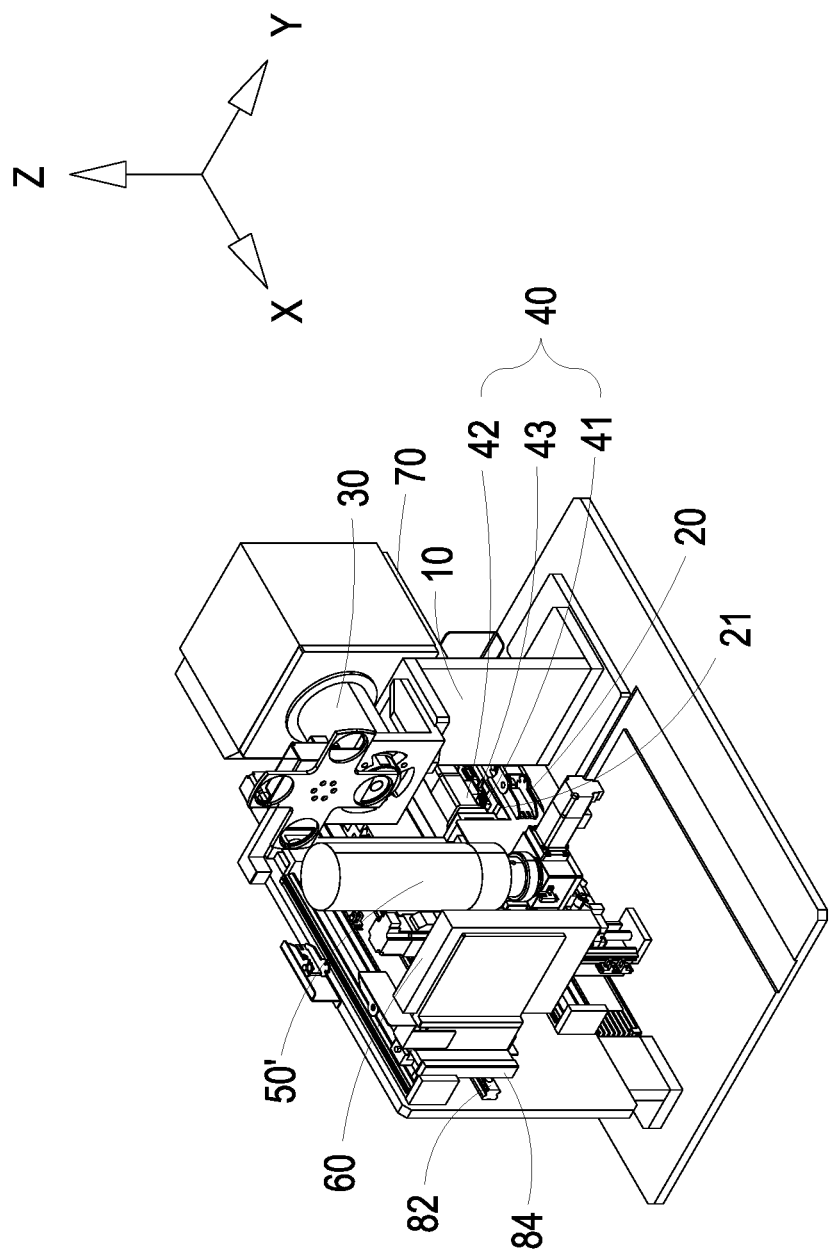
FIGS. 12A and 12B are perspective structural views showing the tomographic imaging system having the connection assembly assembled according to the second embodiment of the present disclosure and taken at different observation angles.
Figure 12B:
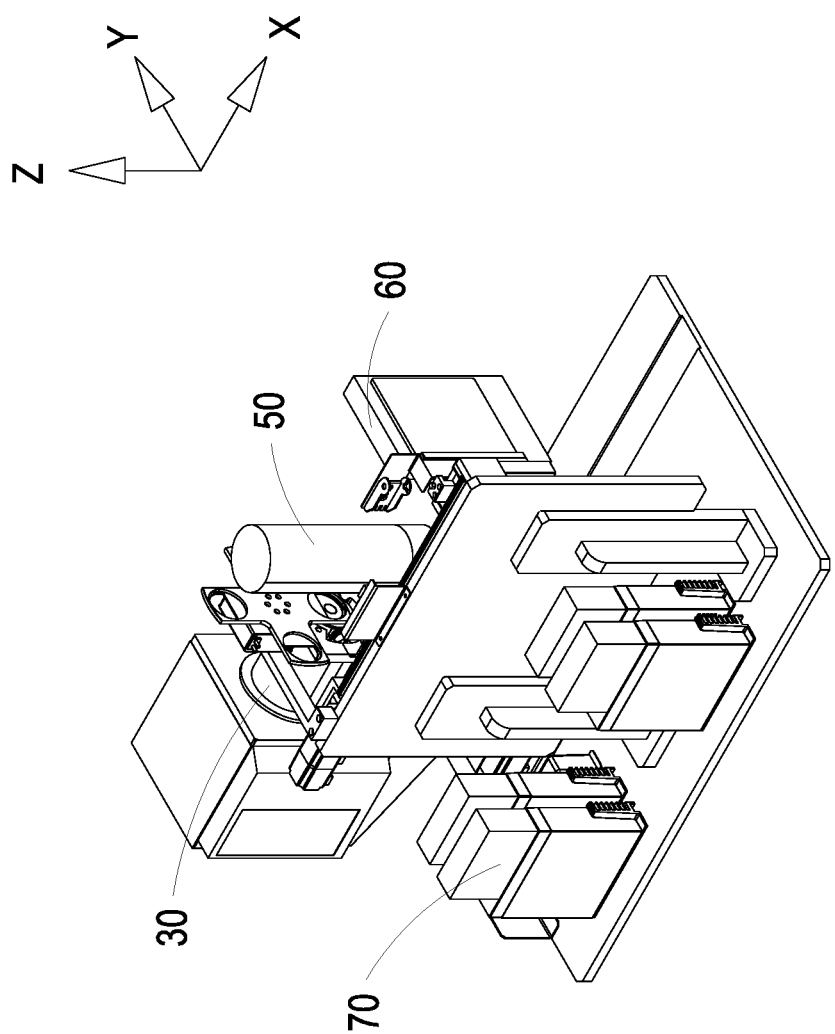

FIGS. 11A and 11B are perspective structural views showing a tomographic imaging system having a connection assembly disassembled according to a second embodiment of the present disclosure and taken at different observation angles. FIGS. 12A and 12B are perspective structural views showing the tomographic imaging system having the connection assembly assembled according to the second embodiment of the present disclosure and taken at different observation angles. In the embodiment, the elements and functions of the tomographic imaging system 1a are similar to those of the tomographic imaging system 1 in FIGS. 1A to 2B, and are not redundantly described herein. Different from the tomographic imaging system 1 of FIGS. 1A to 2B, in the embodiment, the size of the holding bed 50' is larger than the size of the holding bed 50, so as to facilitate the holding bed 50' to carry the object 9 on a large scale (referring to FIG. 6). Preferably but not exclusively, when the holding bed 50' is detachably connected to the carrying platform 40, the controller 70 controls the base 20 to move with the carrying platform 40 and the holding bed 50 along the X-axis direction and adjust the height level of the object 9 along the Z-axis direction. At the same time, the detector 60 is moved along the X-axis direction. Consequently, the light generator 30, the object 9 and the detector 60 are arranged in a line for the tomographic scan, as shown in FIGS. 12A and 12B. In another embodiment, the holding bed 50' is detached from the carrying platform 40, and the holding bed 50 is connected to the carrying platform 40, as shown in FIGS. 2A and 2B. Since the tomographic imaging system 1 or the computer tomography system 1a can identify the holding bed 50 or the holding bed 50', the user's setup operation can be omitted and it ensures the correctness of the tomographic scan.

Moreover, it is noted that, in the forgoing embodiments, the plurality of first conductive terminals 423 of the first circuit board 42 and the plurality of second conductive terminals 531 of the second circuit board 53 of the connection assembly 4 are spatially corresponding to each other. In other embodiments, the positions of the plurality of first conductive terminals 423 of the first circuit board 42 and the plurality of second conductive terminals 531 of the second circuit board 53 are adjustable according to the practical requirements.

Figure 13:
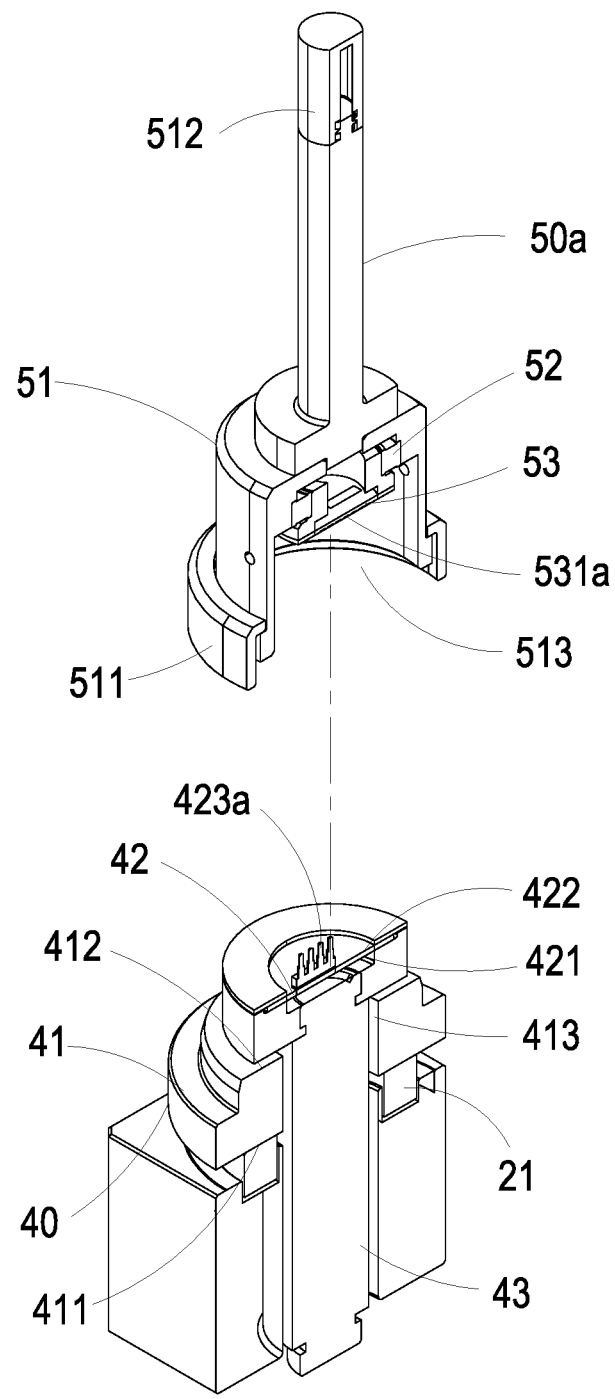
FIG. 13 is a cross sectional view illustrating a fourth exemplary structure of the connection assembly of the present disclosure.
Figure 14:
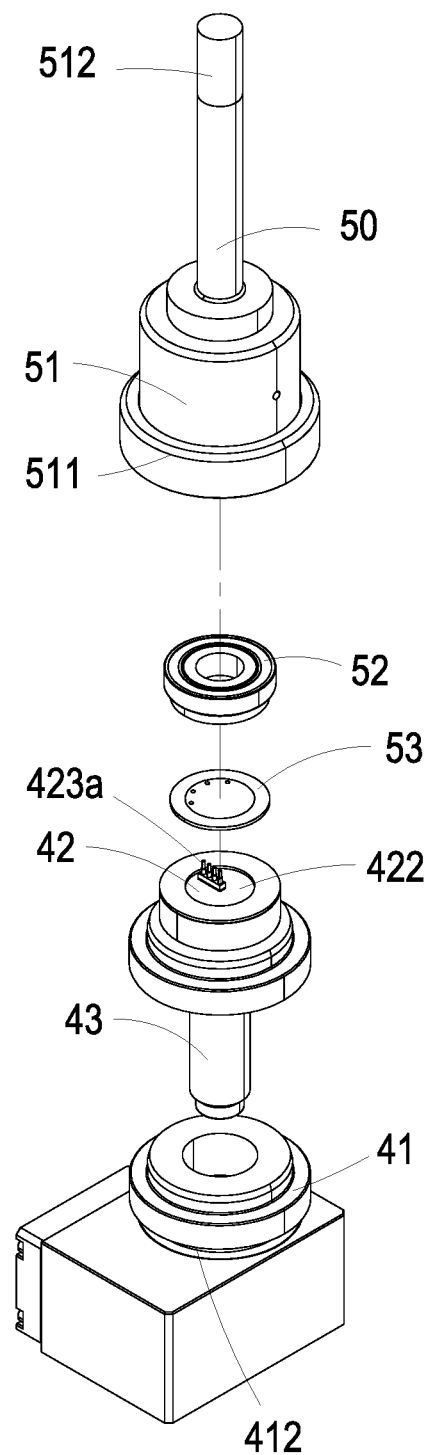
FIG. 14 is an explode view illustrating the connection assembly of FIG. 13.
Figure 15:
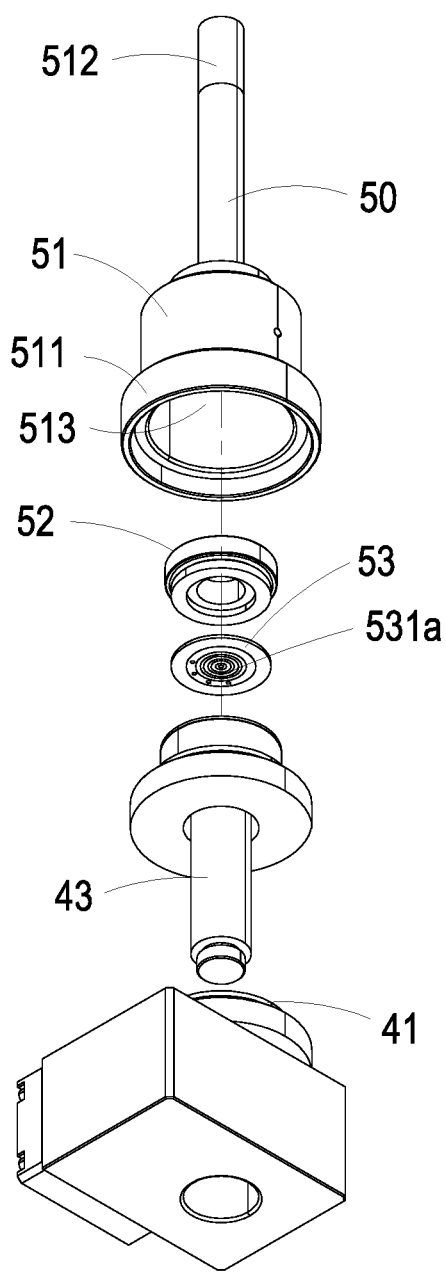
FIG. 15 is an explode view illustrating the connection assembly of FIG. 13 and taken at different observation angles.
Figure 16:
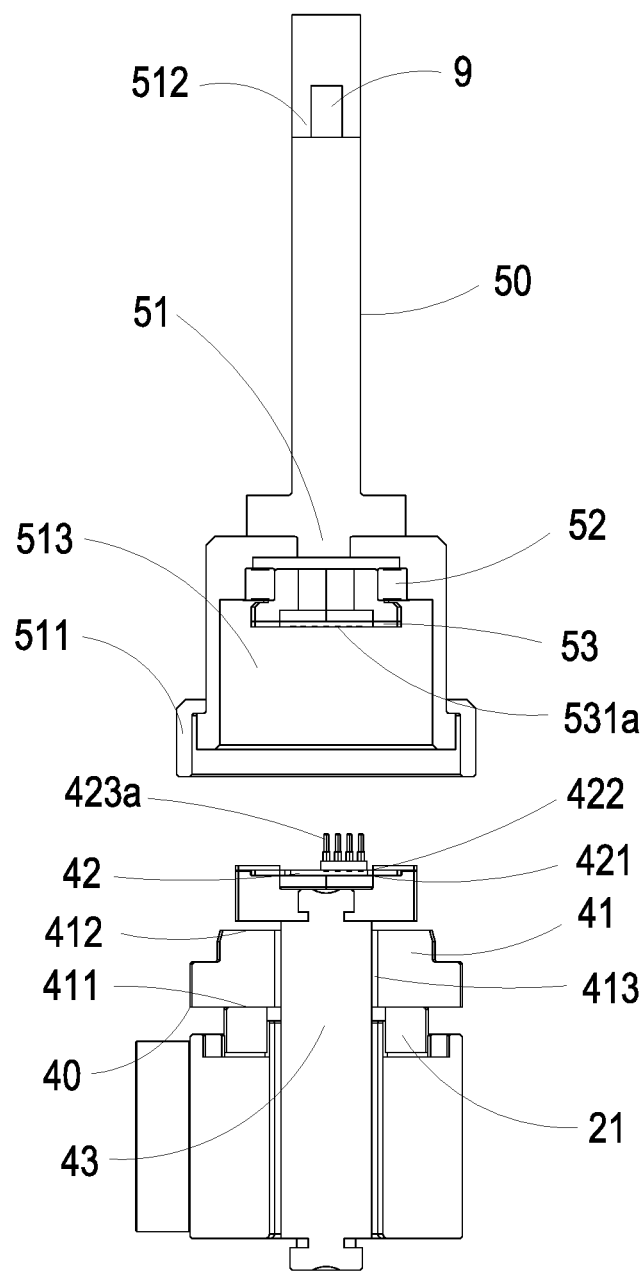
FIG. 16 is a cross sectional view illustrating the connection assembly of FIG. 13, which is disassembled.
Figure 17:
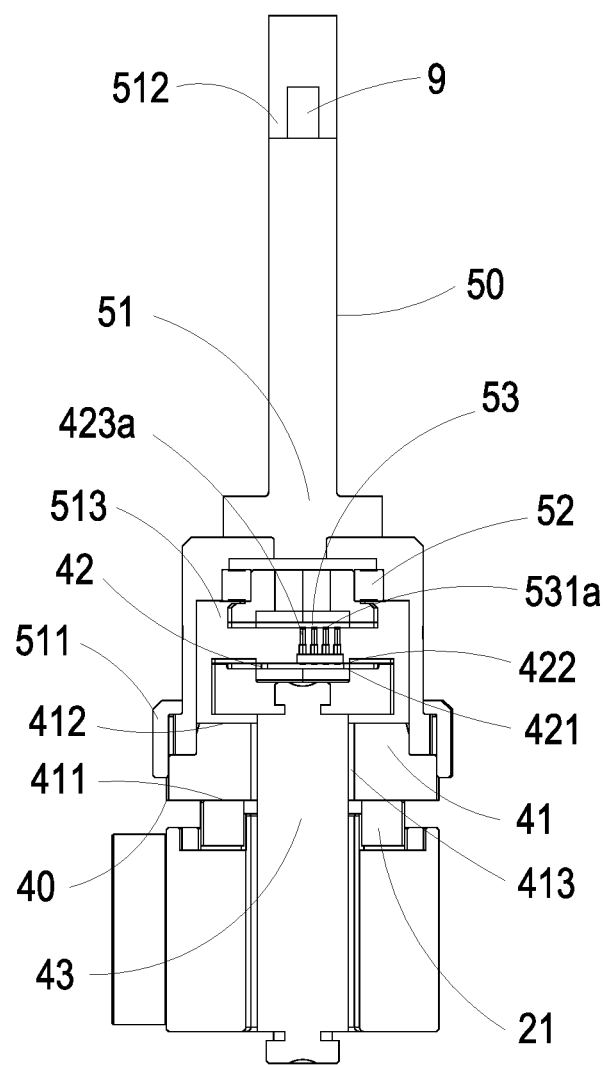
FIG. 17 is a cross sectional view illustrating the connection assembly of FIG. 13, which is assembled.

FIG. 13 is a cross sectional view illustrating a fourth exemplary structure of the connection assembly of the present disclosure. FIG. 14 is an explode view illustrating the connection assembly of FIG. 13. FIG. 15 is an explode view illustrating the connection assembly of FIG. 13 and taken at different observation angles. FIG. 16 is a cross sectional view illustrating the connection assembly of FIG. 13, which is disassembled. FIG. 17 is a cross sectional view illustrating the connection assembly of FIG. 13, which is assembled. In the embodiment, the elements and functions of the connection assembly 4a are similar to those of the connection assembly 4 in FIGS. 3 to 9, and are not redundantly described herein. Different from the connection assembly 4 of FIGS. 3 to 9, in the embodiment, the plurality of first conductive terminals 423a of the first circuit board 42 are for example but not limited to elastic conductive terminals, and disposed in a linear arrangement. The plurality of second conductive terminals 531a of the second circuit board 53 are spatially corresponding to the plurality of first conductive terminals 423a and disposed in a concentric circle arrangement. When the engaging portion 511 of the holding component 51 of the holding bed 50 is connected to the second end 412 of the rotatable component 41 of the carrying platform 40, the plurality of second conductive terminals 531a of the second circuit board 53 and the plurality of first conductive terminals 423a of the first circuit board 42 abut against and are electrically connected to each other to generate an identification signal. Thus, the controller 70 (referring to FIG. 1B) can identify the holding bed 50 connected to the carrying platform 40, so as to perform the tomographic scan. Namely, the combinations of the plurality of conductive terminals in the concentric circle arrangement and the plurality of conductive terminals in the linear arrangement for the electric connection between the first circuit board 42 and the second circuit board 53 are adjustable according to the practical requirements.

In summary, the present disclosure provides a tomographic imaging system and a connection assembly thereof, which are capable of identifying the holding bed automatically. The structure of the connection assembly includes a bearing connected between the holding component and the circuit board of the holding bed. When the holding component rotates, the circuit board of the holding bed is kept stationary, to avoid the danger of twisting the wire. On the other hand, the carrying platform of the connection assembly is provided with a plurality of conductive terminals arranged in a concentric circle, which are spatially corresponding to a plurality of conductive terminals linearly arranged on the holding bed. As the holding bed is rotated at any angle in 360-degree rotation, the holding bed and the carrying platform can be connected detachably to achieve an electrical connection therebetween effectively. Thus, the function of identify the holding bed automatically is achieved.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A connection assembly adapted for a tomographic imaging system, comprising:
   a carrying platform comprising a rotatable component, a first circuit board and a connection component wherein the rotatable component comprises an opening, the first circuit board comprises a plurality of first conductive terminals, and the connection component is passed through the opening and connected to the first circuit board, wherein the rotatable component is configured to be driven by a rotor to rotate relative to the first conductive terminals and the connection component; and
   a holding bed comprising a holding component, a bearing and a second circuit board, wherein the holding component comprises an engaging portion and a space, the second circuit board is accommodated within the space and connected to the holding component through the bearing, and the second circuit board comprises a plurality of second conductive terminals, wherein the engaging portion and the rotatable component are detachably connected to each other so that the second conductive terminals are spatially corresponding to and electrically connected to the first conductive terminals.

2. The connection assembly according to claim 1, wherein the plurality of first conductive terminals are disposed in a concentric circle arrangement, and the plurality of second conductive terminals are disposed in a linear arrangement, wherein the holding bed is rotated around an axis passing through a center of the concentric circle arrangement.

3. The connection assembly according to claim 1, wherein the plurality of first conductive terminals are disposed in a linear arrangement, and the plurality of second conductive terminals are disposed in a concentric circle arrangement, wherein the holding bed is rotated around an axis passing through a center of the concentric circle arrangement.

4. The connection assembly according to claim 1, wherein the rotor drives the rotatable component of the carrying platform and the holding component of the holding bed to rotate relative to the first conductive terminals and the second conductive terminals.

5. The connection assembly according to claim 1, wherein the engaging portion of the holding component includes an annular collar.

6. The connection assembly according to claim 1, wherein the first conductive terminals abut against the second conductive terminals.

7. A tomographic imaging system, comprising:
a frame body;
a base slidably disposed on the frame body and comprising a rotor;
a light generator disposed on the frame body;
a connection assembly, comprising:
  a carrying platform connected to the base and comprising a rotatable component, a first circuit board and a connection component, wherein the rotatable component is connected to the rotor of the base and configured to be driven to rotate by the rotor, wherein the connection component is passed through an opening of the rotatable component and connected to the first circuit board and the base respectively, and the first circuit board comprises a plurality of first conductive terminals; and
  a holding bed comprising a holding component, a bearing and a second circuit board, wherein the holding component comprises an engaging portion and a space, the second circuit board is accommodated within the space and connected to the holding component through the bearing, and the second circuit board comprises a plurality of second conductive terminals, wherein the engaging portion is detachably connected to the rotatable component so that the first conductive terminals and the second conductive terminals are electrically connected to each other to generate an identification signal;
a detector slidably disposed on the frame body; and
a controller disposed on the frame body and configured to receive the identification signal and adjust positions of the carrying platform, the holding bed and the detector relative to the light generator according to the identification signal respectively, wherein the rotor is controlled by the controller to rotate an object carried on the holding component of the holding bed through the rotatable component, whereby the light generator irradiates the object to perform a tomographic scan.

8. The tomographic imaging system according to claim 7, wherein the first conductive terminals are disposed in a concentric circle arrangement, and the second conductive terminals are disposed in a linear arrangement.

9. The tomographic imaging according to claim 8, wherein the holding bed is configured to rotate around an axis passing through a center of the concentric circle arrangement.

10. The tomographic imaging system according to claim 7, wherein the first conductive terminals are disposed in a linear arrangement, and the second conductive terminals are disposed in a concentric circle arrangement.

11. The tomographic imaging system according to claim 10, wherein the holding bed is configured to rotate around an axis passing through a center of the concentric circle arrangement.

12. The tomographic imaging system according to claim 7, wherein the holding bed is configured to be replaced by another holding bed, wherein when the another holding bed is detachably connected to the rotatable component, another identification signal different from the identification signal is generated.

13. The tomographic imaging system according to claim 12, wherein the identification signal includes parameters of a first distance between the light generator and the detector, a second distance between the light generator and the object and a third distance between the object and the detector.

14. The tomographic imaging system according to claim 12, wherein the another identification signal includes parameters of another first distance, another second distance and another third distance among the light generator, the detector and the object.

15. The tomographic imaging system according to claim 7, wherein the rotor drives the rotatable component of the carrying platform and the holding component of the holding bed to rotate, the first circuit board and the connection component of the carrying platform and the second circuit board of the holding bed are relative stationary.

16. The tomographic imaging system according to claim 7, wherein the first conductive terminal or the second conductive terminal is an elastic conductive terminal, wherein when the first conductive terminal and the second conductive terminal abut against each other, an elastic cushioning force is provided therebetween.

17. The tomographic imaging system according to claim 7, further comprising a first sliding rail connected between the frame body and the base, wherein the base is configured to slide relative to the frame body along the first sliding rail.

18. The tomographic imaging system according to claim 17, further comprising a first movement device disposed between the base and the first sliding rail and electrically connected to the controller, wherein the first movement device is controlled by the controller to slide the base along the first sliding rail.

19. The tomographic imaging system according to claim 7, further comprising a second sliding rail connected between the frame body and the detector, wherein the detector is configured to slide relative to the frame body along the second sliding rail.

20. The tomographic imaging system according to claim 19, further comprising a second movement device disposed between the detector and the second sliding rail and electrically connected to the controller, wherein the second movement device is controlled by the controller to slide the detector along the second sliding rail.

21. A connection assembly adapted for a tomographic imaging system, comprising:
a carrying platform comprising a rotatable component, a plurality of first conductive terminals, and a connection component, wherein the connection component is passed through an opening of the rotatable component and supporting the first conductive terminals, and the rotatable component is configured to be driven to rotate by a rotor; and
a holding bed comprising a holding component, a bearing and a plurality of second conductive terminals, wherein the holding component comprises an engaging portion and a space, the second conductive terminals are accommodated within the space and connected to the holding component through the bearing, wherein the engaging portion and the rotatable component are detachably connected to each other so that the second conductive terminals are spatially corresponding to and electrically connected to the first conductive terminals to generate an identification signal, and the holding component is driven by the rotor to rotate relative to the first conductive terminals, the second conductive terminals and the connection component.

\* \* \* \* \*